United States Patent [19]

Ishikawa et al.

[11] Patent Number: 5,206,930
[45] Date of Patent: Apr. 27, 1993

[54] METHOD OF COMPLIANCE CONTROL OF A MANIPULATOR

[75] Inventors: Hiroshi Ishikawa, Ichikawa; Chihiro Sawada, Tokyo, both of Japan

[73] Assignee: International Business Machines Corporation, Armonk, N.Y.

[21] Appl. No.: 833,567

[22] Filed: Feb. 7, 1992

Related U.S. Application Data

[63] Continuation of Ser. No. 717,183, Jun. 18, 1991, abandoned, which is a continuation of Ser. No. 320,359, Mar. 8, 1989, abandoned.

[30] Foreign Application Priority Data

Mar. 15, 1988 [JP] Japan .................................. 63-59574

[51] Int. Cl.$^5$ .......................... G05B 19/18; B25J 9/18
[52] U.S. Cl. ........................................ 395/95; 395/86; 318/568.18; 364/474.36; 901/45
[58] Field of Search ................. 364/513, 474.3, 474.36; 901/8, 9, 15, 33, 34, 45; 395/86, 97, 96, 95; 318/568.17, 568.18, 568.19

[56] References Cited

U.S. PATENT DOCUMENTS

| | | | |
|---|---|---|---|
| 4,621,332 | 11/1986 | Sugimoto et al. | 364/513 |
| 4,680,519 | 7/1987 | Chand et al. | 395/97 X |
| 4,756,662 | 7/1988 | Tanie et al. | 901/15 |
| 4,808,063 | 2/1989 | Haley | 364/513 |
| 4,815,006 | 3/1989 | Andersson et al. | 364/513 |
| 4,826,392 | 5/1989 | Hayati | 364/513 |
| 4,860,215 | 8/1989 | Seraji | 364/513 |

FOREIGN PATENT DOCUMENTS 0129245 12/1984 European Pat. Off. .

OTHER PUBLICATIONS

H. Kazerooni, "Automated Roboting Deburring Using Electronic Compliancy"; Impedence Control; Proc. 1987 *IEEE* International Conference on Robotics and Automation, pp. 1025–1032.
H. West, et al, "A Method for the Design of Hybrid Position/Force Controllers for Manipulators Constrained by Contact with the Environment"; Proc. 1985 International Conference on Robotics and Automation, pp. 251–259.
H. Tolle, "Die Roboterhand bekommt Gefühl"; Electrotechnike, vol. 69 No. 5, Mar. 1987, pp. 16–28.

*Primary Examiner*—Parshotam S. Lall
*Assistant Examiner*—Collin W. Park
*Attorney, Agent, or Firm*—Philip J. Feig

[57] ABSTRACT

A method of compliance control of an industrial manipulator having a high position rigidity is achieved by integrating the motion equation to obtain a position displaced by a detected external force, calculating the trajectory of a position in a joint coordinate system with inverse kinematics, differentiating the calculated trajectory to obtain the trajectories of velocity and acceleration, and performing position control using these latter trajectories. The result is allowance of the compliance to be specified in any desired Cartesian coordinate system in the form of second-order perturbations including stiffness and damping. Moreover, the specified compliance can be realized with separation of the compliance specifications from the system feedback gain.

7 Claims, 4 Drawing Sheets

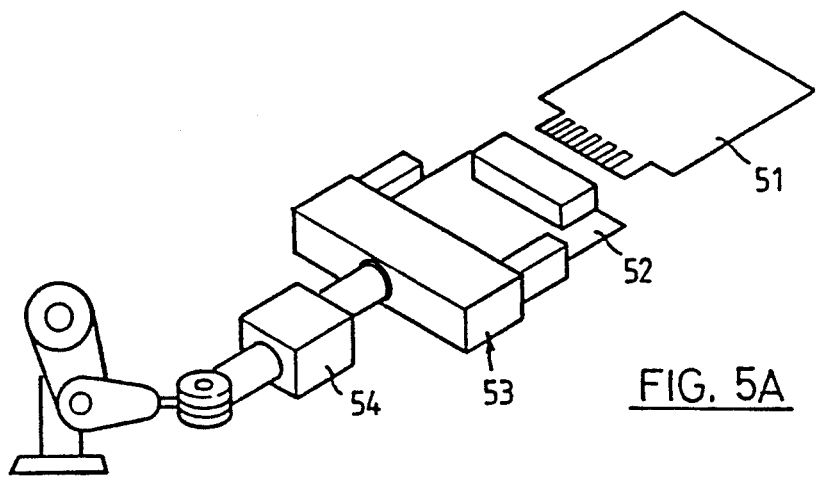
FIG. 5A
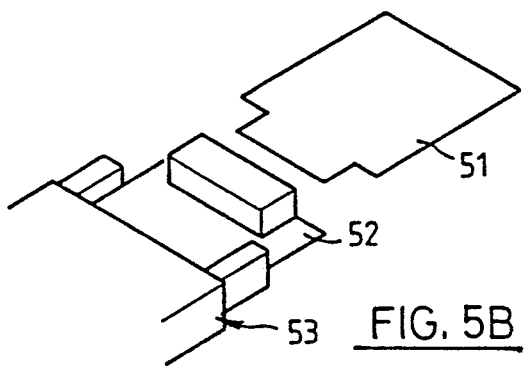
FIG. 5B
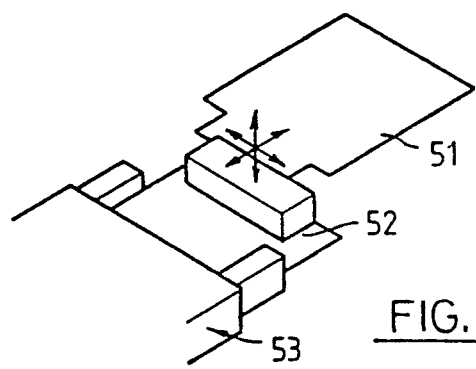
FIG. 5C
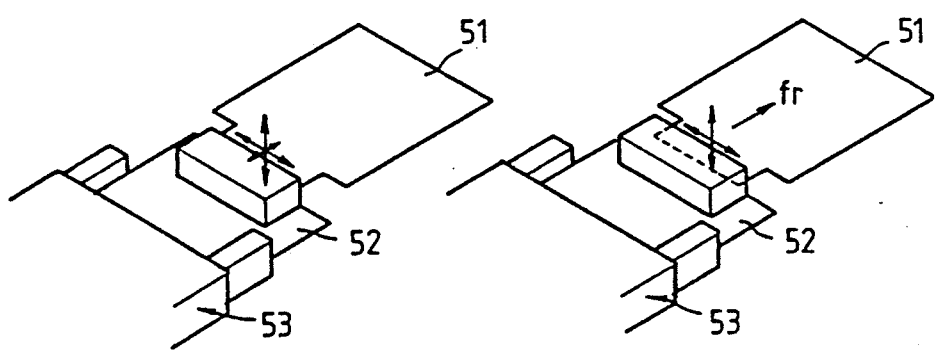
FIG. 5D
FIG. 5E

METHOD OF COMPLIANCE CONTROL OF A MANIPULATOR

This application is a continuation of application Ser. No. 07/717,183 filed Jun. 18, 1991, now abandoned, which is a continuation of application Ser. No. 07/320,359 field Mar. 8, 1989, now abandoned.

FIELD OF THE INVENTION

This invention relates to a method for compliance control, and more particularly to a control method for achieving any desired degree of stiffness and damping so that an object such as a hand of an industrial manipulator can be controlled by means of feedback from a force sensor.

BACKGROUND OF THE INVENTION

When work such as assembly is performed using a manipulator having a hand, it is necessary to adjust or control the force or stiffness of the hand in some manner. In other words, when only position control is performed, a conventional industrial manipulator simply has high position rigidity and operates by disregarding the affects of the workpiece to be handled. The result is that, if the manipulator is required to perform assembly work such as insertion, the manipulator movement cannot adapt to the shape of the workpiece. In addition, if there is a resulting large deviation in the position, the workpiece may be damaged. Normally, a spring or similar resilient object is mounted on the manipulator hand as a buffer in case of contact in order to adjust the stiffness of the hand. Compliance control is a method used to perform the stiffness adjustment of the hand for matching the hand stiffness with the external environment, while obviating the need for a mechanism such as the spring, but at the same time controlling the manipulator as if the hand contained a spring.

The balance of force in a dynamic system involves not only force from the stiffness of a spring, but also those forces emanating from sources such as a damper, inertia, and a force source. It is necessary to take all these parameters into consideration when matching the hand stiffness with the external environment. The compliance for matching with the external environment is represented by a second-order equation of motion as shown schematically in FIG. 2 and equation 1 below. Generally, translational and rotational motion are processed separately for each coordinate axis of the Cartesian coordinate system for which compliance control is sought. That is, $$M(\ddot{p}-\ddot{p}_r)+K_d(\dot{p}-\dot{p}_r)+K_s(p-p_r)=K_f(f_r-f). \quad \text{(Eq. 1)}$$

$$C^cM\ C^T(\ddot{p}-\ddot{p}_r)+C^cK_dC^T(\dot{p}-\dot{p}_r)+C^cK_sC^T(p-p_r)$$
$$=C^cK_fC^T(f_r-f).$$

where, $P_r$ : Goal value of hand position (6 vectors)
p : Hand position (6 vectors)
$f_r$ : Goal value of force applied on hand (6 vectors)
f : Force applied on hand
M : Imaginary mass.inertia in the global coordinate system (6×6 matrix)
$K_d$ : Damping coefficient in the global coordinate system (6×6 matrix)
$K_s$ : Spring coefficient in the global coordinate system (6×6 matrix)
$K_f$ : Compliance selection matrix in the global coordinate system (6×6 matrix)
C : Compliance coordinate system
$c_M$ : Imaginary mass.inertia in the compliance coordinate system (6×6 diagonal matrix)
$c_{Kd}$ : Damping coefficient in the compliance coordinate system (6×6 diagonal matrix)
$c_{Ks}$ : Spring coefficient in the compliance coordinate system (6×6 diagonal matrix)
$c_{Kf}$ : Compliance selection matrix in the compliance coordinate system (6×6 diagonal matrix of which diagonal element is 1 or 0)

In the present case, the compliance selection matrix ($c_{Kf}$) is analogous to a switch for selecting whether the force should be considered (1) or not considered (0) in the compliance coordinate. If compliance is considered for each axis, it is the same type of suspension as that found in cars and many other products. In other words, the purpose of the compliance control may be said, as shown in FIG. 2, to control the manipulator as if the hand had a suspension mechanism consisting of a spring, a damper, an imaginary mass and a force source, and furthermore to control the manipulator so as to satisfy the motion equation of equation (1).

Conventional compliance control simplifies the equation, and mainly considers mechanisms as either a spring or a damper.

In addition, the publication "Force Feedback Control of Robot Arm" by Kouichiro Sugimoto, Journal of the Society of Instrument and Control Engineers, Vol. 25, No. 1, Jan., 1986 describes a technique for performing compliance control by detecting external forces with a force sensor for velocity control of a manipulator.

According to the above publication, motion equation (1), in the global coordinate system, including values of the detected force, is integrated to obtain a velocity which is converted into a velocity in the joint coordinate system by the Jacobian matrix, to then perform ordinary velocity control. When equation (1) is simplified by assuming $K_f$ to be a unit matrix, and the goal values of velocity, acceleration and force ($\dot{P}_r$, $\ddot{P}_r$, $f_r$) to be 0, the equation reduces to $$M\ddot{p}=-K_d\dot{p}+K_s(p_r-p)-f \quad \text{(Eq. 2)}$$

The following equation is obtained by multiplying both sides of the equation by an inverse matrix of M and then by performing integration.

$$\dot{p}=M^{-1}\int[-K_d\dot{p}+K_s(P_r-p)-f]dt \quad \text{(Eq. 3)}$$

The equation may then be represented in a different form as:

$$\dot{p}_n=TM^{-1}[K_s(P_r-p)-f]+(I-Tm^{-1}K_d)\dot{P}_{n-1} \quad \text{(Eq. 4)}$$

wherein, T is sampling time.

When the velocity ($\dot{P}_n$) is converted to that in the joint coordinate system by the Jacobian matrix, the goal angular velocity of the joint ($\dot{q}_n$) is obtained as:

$$\dot{q}_n = J^{-1}\dot{p}_n$$
$$= J^{-1}[TM^{-1}[K_s(p_r-p)-f]+(I-TM^{-1}K_d)\dot{p}_{n-1}] \quad \text{(Eq. 5)}$$

Namely, any compliance of a second-order mechanism is realized by velocity control of the manipulator by the joint angular velocity ($\dot{q}_n$) that is obtained by substituting fed-back position (p) and force (f) in equation (5).

However, this approach still has a problem. The control method may become unstable when subjected to friction. Considering position stability, FIG. 3 shows a block diagram of a position stability control technique. It should be noted that the position feedback signal is returned to the step where the trajectory is generated. When terms relating to the position feedback are extracted from the equation (3), the following equation is obtained.

$$\dot{P}_{rc} = M^{-K}{}_s\!\int (P_r - p)\, dt \qquad (Eq. 6)$$

The velocity in the global coordinate system is represented as $p_{rc}$ to avoid confusion with the feedback value p. The goal angular velocity of the joint $q_{rc}$ is obtained by converting $p_{rc}$ for the joint coordinate system.

$$\dot{q}_{rc} = J(q)^{-1} M^{-1} K_s \!\int (p_r - p)\, dt \qquad (Eq. 7)$$

Assuming the velocity feedback gain to be K as shown in FIG. 3, the torque to be applied to the joint is as follows:

$$\begin{aligned}\tau &= K\dot{q}_{rc} \\ &= KJ(q)^{-1} M^{-1} K_s \!\int (p_r - p) dt \end{aligned} \qquad (Eq. 8)$$

Alternatively, assuming the position feedback $K_2$ to be $$K_2 = KJ(q)^{-1} M^{-1} K_s \qquad (Eq. 9)$$

then $$K_2 \!\int (p_r - p)\, dt \qquad (Eq. 10)$$

Thus, for the position feedback, integral control is provided.

Generally, an industrial manipulator has high friction because of mechanisms such as reduction gears. Suppose the static friction at the joint to be $\tau_{fs}$, the dynamic friction to be $\tau_{fd}$. Now, it is assumed that the position p slightly deviates from its goal value $p_r$. In this case, the joint initially stops because of the static friction, but the right side of the equation (10) is integrated over time and increases as time elapses until becoming equal to the static friction torque $T_{fs}$ at a time $t_i$. That is, $$T_{fs} = \tau = K_2(p_r - p)\, t_i \qquad (Eq. 11)$$

Thereafter, the joint torque becomes larger than the static friction, and the joint starts to move. The friction during operation or the dynamic friction torque $\tau_{fd}$ is smaller than the static friction torque $\tau_{fs}$, so that the joint overshoots the goal value $p_r$, and goes out of position to the opposite side. Then, when torque in the opposite direction increases and exceeds the static friction as time passes, the joint starts to move in the opposite direction. Under this control, such operation continues indefinitely. FIG. 4 shows this operation. Such operation occurs best when the position gain $K_2$ is small. Conversely, it is sufficient to increase the position gain $K_2$ in order to reduce the cycle of the operation and the amplitude of the position deviation. In ordinary integral control, the position gain $K_2$ is increased to a value not causing oscillation. In other words, it is not preferable to significantly change the position feedback gain when considering controllability.

The purpose of the compliance control is to adjustably set the spring (stiffness) and the damper (damping) of the hand during manipulator operation. According to the control technique, the stiffness of the spring is varied by changing the spring constant $K_s$ in equation (3), i.e. to vary the position gain $K_2$ in equation (9). For example, assume that a weak spring is desired. If the spring constant $K_s$ is made smaller, this necessarily makes the position gain $K_2$ smaller, and the above-mentioned oscillation becomes unavoidable. Referring to the equation (9), another limiting factor of the position gain $K_2$ involves a matrix to convert values from the global coordinate system to the joint coordinate system, that is, use of the inverse Jacobian matrix $J(q)^{-1}$. This matrix is a function of the angle of the joint, and its value varies significantly from 0 to infinity depending upon the configuration of the manipulator. Therefore, the value of position gain $K_2$ also varies significantly. As a result, rigidity that is set for one manipulator configuration sometimes cannot be used for another manipulator configuration. This result follows from the fact that the stiffness of the spring in the compliance control varies as the position gain $K_2$ is changed.

Therefore, in order to overcome these shortcomings, consideration must be made when the generating a trajectory to separate the requirements of the specified compliance from the requirements of the feedback gain.

SUMMARY OF THE INVENTION

A primary object of the present invention is, therefore, the provision of a mechanism for controlling the compliance of an industrial manipulator that has a high position rigidity as a result of using a servo mechanism. Control is achieved by integrating the motion equation (1) above in order to obtain a position displaced by a detected external force, calculating the trajectory of a position in a joint coordinate system with inverse kinematics, differentiating the calculated trajectory to obtain the trajectories of velocity and acceleration, and performing position control using these latter trajectories. The result is allowance of the compliance to be specified in any desired Cartesian coordinate system in the form of second-order perturbations including not only stiffness but also damping. In addition, the specified compliance can be precisely realized by specifically separating the specifications of compliance from the feedback gain.

Other objects of the invention will become more clearly apparent when the following description is taken in conjunction with the accompanying drawing.

BRIEF DESCRIPTION OF THE DRAWINGS

FIGS. 5A through 5E diagrammatically illustrate an insertion operation of a plug into an edge connector using the control method of the invention.

DETAILED DESCRIPTION

Figure 1:
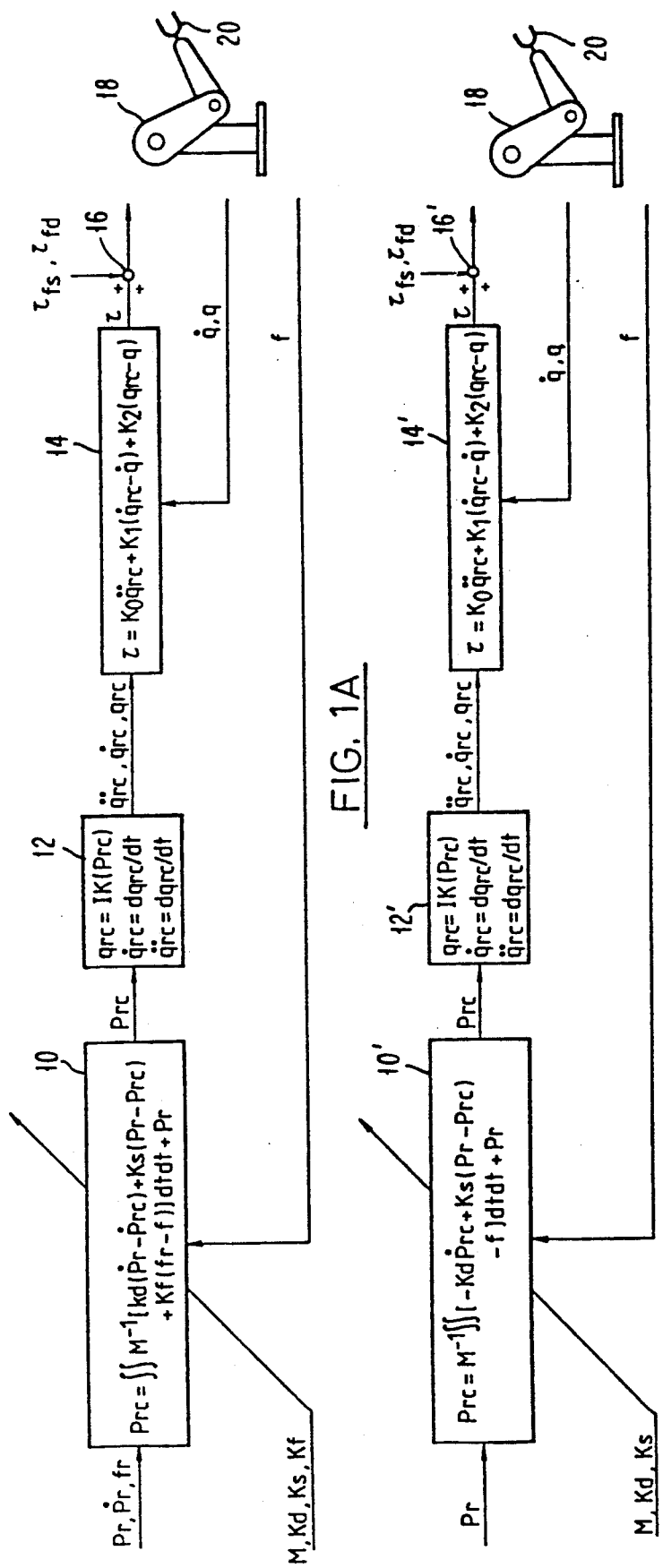
FIGS. 1A and 1B are schematic block diagrams illustrating a preferred embodiment of the compliance control method, according to the invention.
Figure 2:
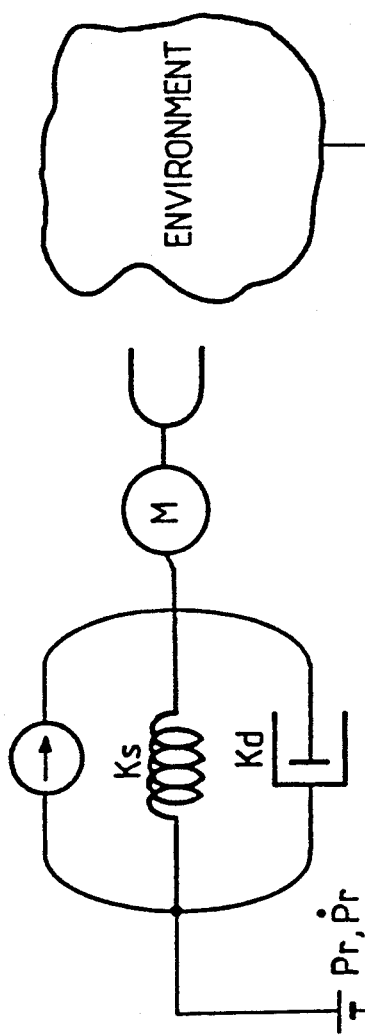
FIG. 2 is a schematic diagram representing compliance of a hand of a manipulator.

Referring now to the figures and to FIGS. 1A and 1B in particular, there are shown a schematic block diagram of a preferred embodiment of the present invention. FIG. 1A embodies equations (12) to (16) below, as will be described hereinafter. FIG. 1B shows an example where, for comparison purposes with FIG. 3, Kf of the parameters in FIG. 1A is assumed to be a unit matrix and the goal values of velocity and force ($\dot{p}_r$ and $f_r$) are assumed to be 0, otherwise the embodiment of FIG. 1B, indicated with prime notation, is the same as the embodiment in FIG. 1A.

Figure 3:
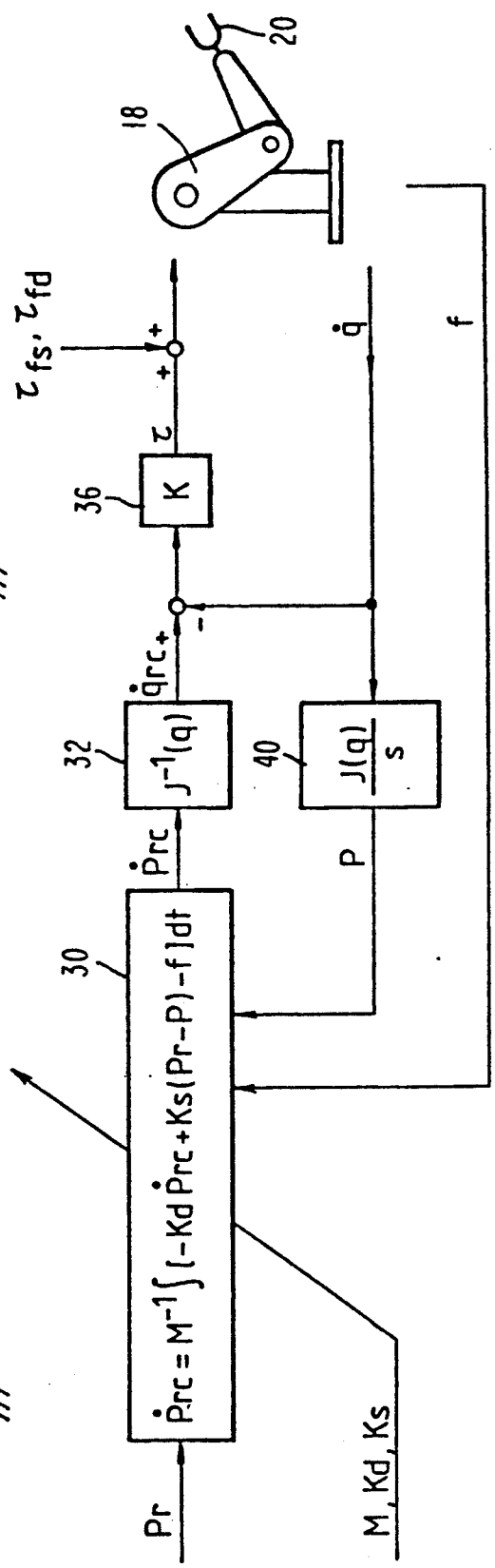
FIG. 3 is a schematic block diagram illustrating a conventional compliance control method.
Figure 4:
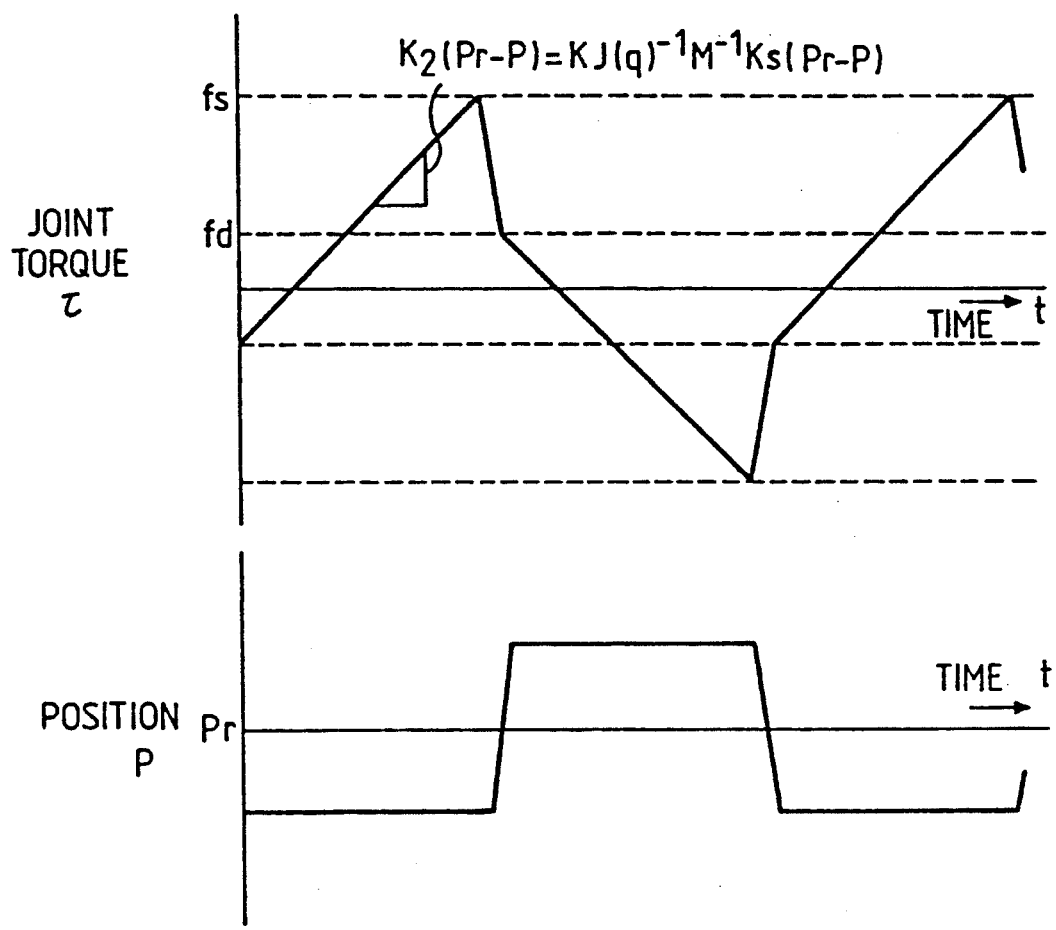
FIG. 4 is a graphical representation illustrating a state of oscillation found in the conventional compliance control.

In order to better understand the present invention, reference is made to conventional compliance control as shown in FIG. 3, where box 30 calculates the velocity equation (3) above. The joint angular velocity is calculated in box 32 by solving equation (5) above. The fed-back joint angular velocity $\dot{q}$ is subtracted from the calculated joint angular velocity $q_{rc}$ in summer 34. The resultant error signal from summer 34 is multiplied by the velocity feedback gain K in box 36 for providing a torque $\tau$ which is added to the static friction torque ($\tau_{fs}$) and the dynamic friction torque ($\tau_{fd}$) in summer 38 for providing a final value torque to the joint of manipulator 18.

The input values to box 30 are the goal position value (Pr), the imaginary mass-inertia in the global coordinate system (M, a 6×6 matrix), the damping coefficient in the global coordinate system ($k_d$, a 6×6 matrix) and the spring coefficient in the global coordinate system ($k_s$, a 6×6 matrix). In addition, a sensed force (f) applied to hand 20 is fed-back as an input to box 30. Also, the joint angular velocity ($\dot{q}$) fed-back from the manipulator 18 is integrated with the Jacobian matrix (J(q)) in box 40 and the resultant hand position P is provided as an input to box 30.

The present control method can be considered in the following three stages.

GENERATION OF COMPLIANCE TRAJECTORY

The second-order equation of compliance in equation (1) includes specified goal values of position ($p_r$), velocity ($\dot{p}_r$) and force ($f_r$) in a global coordinate system, feed-back value (f) from a sensor and imaginary mass-inertia (M), a damping coefficient ($K_d$), a spring coefficient ($K_s$), and a compliance selection matrix ($K_f$). The position (p) is rewritten as a compliance trajectory ($p_{rc}$). The equation is integrated twice in box 10 (FIG. 1A) in order to obtain a position trajectory ($p_{rc}$) that satisfies the equation. Namely, $$p_{rc} = \int\int M^{-1}[K_d(\dot{p}_r - \dot{p}_{rc}) + K_s(p_r - p_{rc}) + K_f(f_r - f)]dt\,dt + p_r \quad \text{(Eq. 12)}$$

COORDINATE TRANSFORMATION AND GENERATION OF COMPLIANCE TRAJECTORY IN A JOINT COORDINATE SYSTEM

An angle trajectory ($q_{rc}$) in a joint coordinate system is obtained from the position trajectory ($p_{rc}$) in the global coordinate system by solving the inverse kinematic equations in box 12 (FIG. 1A). In addition, the angle trajectory ($q_{rc}$) is differentiated to obtain trajectories velocity and angular acceleration ($\dot{q}_{rc}$, $\ddot{q}_{rc}$).

$$q_{rc} = IK(p_{rc}) \quad \text{(Eq. 13)}$$

where IK( ) is the inverse kinematics $$\dot{q}_{rc} = dq_{rc}/dt \quad \text{(Eq. 14)}$$

$$\ddot{q}_{rc} = d\dot{q}_{rc}/dt \quad \text{(Eq. 15)}$$

POSITION CONTROL

Position control is performed in box 14 so that the manipulator joint is caused to follow the generated compliance trajectory in the joint coordinate system.

$$\tau = K_0 \ddot{q}_{rc} + K_1(\dot{q}_{rc} - \dot{q}) + K_2(q_{rc} - q) \quad \text{(Eq. 16)}$$

where q is the fed-back angle of the joint $\dot{q}$ is the fed-back angular velocity of the joint $\tau$ is the torque to be applied to the joint $K_0$, $K_1$, $K_2$ are feedback gains.

According to the present method, the parameters of compliance (M, $K_d$, $K_s$, $K_f$) are distinctively separated from the feedback gains ($K_0$, $K_1$, $K_2$) so that the parameters of compliance, particularly stiffness of a spring ($K_s$), can be independently set. That is, in the control method of the present invention, when the spring stiffness being set is achieved, trajectories are obtained from the equations (12) through (15), and then the position control is performed on the basis of the equation (16), so that, in principle, the spring stiffness $K_s$ for the compliance control is entirely independent of the position feedback $K_2$. Therefore, the present method does not induce the oscillations observed in the technique of the above-mentioned publication. Similarly, the controllability is not adversely affected by the configuration attitude because the position feedback does not involve the inverse Jacobian matrix $J(q)^{-1}$.

In operation, the torque ($\tau$) to be applied to the joint is added to the static friction torque ($\tau_{fs}$) and the dynamic friction torque ($\tau_{fd}$) at summer 16. The summed torque value is applied to manipulator 18 for moving hand 20.

The inputs to box 10 are the goal value of the hand position (Pr), the goal hand velocity ($\dot{P}r$), the goal force value (fr), damping coefficient $K_d$, spring coefficient $K_s$, a compliance section matrix ($K_f$) and an imaginary mass-inertia (M). In addition, the sensed applied force (f) is fed-back from the hand 20 as an input to box 10. Also the sensed joint angle (q) and sensed joint angular velocity ($\dot{q}$) are fed-back to box 14 as inputs.

Now, referring to FIGS. 5A through 5E, work for inserting a plug 51 into a connector 52 using the present control method is shown. It is assumed that the positioned accuracy of the connector and the plug is poor to save cost. As shown in FIG. 5A, a six-axis manipulator 53 includes a force sensor 54 mounted on its hand for each of the six directions. The work starts by bringing the plug 51 to the connector 52, and properly aligning them for insertion. First, the connector 52 is brought to a rough position by position control (FIG. 5B). Then, the connector is moved little by little with the spring being slightly stiff in all directions to search for the plug position based upon the force sensed by the sensor at that moment (FIG. 5C). When the position is substantially located, the connector 52 is inserted with the spring stiff in the direction of the insertion, and soft in the other directions (FIG. 5D). At the time of insertion, the position limit for the insertion operation is not known, but the operation of moving the connector 52 forward continues for so long as possible. When the insertion is substantially completed, the connector is pushed with an increasing force at its goal value in the insertion direction. Then, when a force larger than a predetermined value is detected, the insertion operation is completed and the operation is terminated (FIG. 5E). The parameter for damping is set at a value not to cause oscillation of the control system.

The described processes are incapable of being performed by a commercially available manipulator which is only position controllable. In addition, it is difficult to achieve the performance with an industrial manipulator under conventional compliance control with significant suitable compliance limitations because of the delicate force control attained with the present invention.

The present invention is effective for compliance control at a relatively low speed using an industrial manipulator with high positional rigidity provided by a servo mechanism because the invention reduces compliance control to position control and then performs joint-angle control. The invention makes possible the performance of assembly work that requires delicate force control because the parameters of second-order equations of compliance, particularly the stiffness of a spring ($K_s$), can be more flexibly set than with conventional methods.

While there has been described and illustrated a preferred embodiment of the present invention, it will be apparent to those skilled in the art that modifications and variations are possible without deviating from the broad scope of the invention which shall be limited solely by the scope of the appended claims.

What is claimed is:

1. A method for compliance control in a manipulator system having a hand wherein a force exerted upon the hand to be controlled is detected and the position of the hand is controlled on the basis of the detected force, comprising the steps of:

specificying predetermined parameters for compliance and goal values for position and force applied to the hand;

solving a second-order equation of motion for the hand in a global coordinate system which includes said specified predetermined parameters for compliance, goal values for position and force applied to the hand, and a value for detected force, to generate a first signal commensurate with a position trajectory of the hand in the global coordinate system which satisfies the equation of motion;

transforming said first signal commensurate with a position trajectory of the hand in the global coordinate system into a second signal commensurate with a position trajectory of the hand in a coordinate system specific to the hand;

generating a third signal commensurate with a velocity trajectory and an acceleration trajectory of the hand in the specific coordinate system from said second signal commensurate with a position trajectory of the hand in the specific coordinate system, and performing position control of the hand responsive to said second signal and to said third signal so that the hand follows said position trajectory, velocity trajectory, and acceleration trajectory of the hand in the specific coordinate system.

2. A method in accordance with claim 1, wherein said hand is coupled to a manipulator, the coordinate system specific to said hand being a joint coordinate system.

3. A. method in accordance with claim 1, wherein the position control of said hand is feedback control.

4. A method in accordance with claim 1, wherein stiffness, damping and mass-inertia are specified as parameters for compliance.

5. A method in accordance with claim 1, wherein goals of position, velocity, acceleration and force of the hand are specified as goal values.

6. A method in accordance with claim 1, wherein parameters for compliance and goal values are specified for each coordinate axis.

7. A method in accordance with claim 1, wherein the manipulator performs a series of work steps and the predetermined parameters for said compliance and goal values are specified for each step of the series of work steps.

* * * * *